United States Patent [19]

Fujimori et al.

[11] Patent Number: 5,379,182
[45] Date of Patent: Jan. 3, 1995

[54] HINGED DISPLAY PANEL WITH OUTER COVER AND DISPLAY PANEL UNIT SEPARATELY CONNECTED TO AN INNER COVER AND INFORMATION MACHINE INCLUDING THE SAME

[75] Inventors: Hideaki Fujimori, Tokyo; Tetsu Ishikawa, Tochigi; Yoshihisa Tamura, Gunma; Minoru Imaizumi, Saitama, all of Japan

[73] Assignees: NEC Corporation, Tokyo; Sanyo Electric Co., Ltd., Moriguchi, both of Japan

[21] Appl. No.: 980,190

[22] Filed: Nov. 23, 1992

[30] Foreign Application Priority Data

Nov. 29, 1991 [JP] Japan ............................ 3-098391[U]
Nov. 29, 1991 [JP] Japan ............................ 3-315086
Nov. 29, 1991 [JP] Japan ............................ 3-315088

[51] Int. Cl.⁶ .......................... H05K 5/03; G06F 1/16
[52] U.S. Cl. ...................................... 361/681; 292/8; 292/56
[58] Field of Search ............... 364/708.1; 345/169, 345/905; 359/83; 361/680–682; 70/58; 248/917–923; 312/223.2, 208.4; 292/8, 11, 32, 56, 99

[56] References Cited

U.S. PATENT DOCUMENTS 5,109,570 5/1992 Okada et al. .......................... 16/289
5,229,757 7/1993 Takamiya et al. ............... 361/681 X

FOREIGN PATENT DOCUMENTS 200407 12/1986 European Pat. Off. ............. 359/83
62-257512 11/1987 Japan .
64-78312 3/1989 Japan .
64-54125 4/1989 Japan ............................ G06F 1/00
1-76622 5/1989 Japan .
2-119723 9/1990 Japan .

*Primary Examiner*—Michael W. Phillips
*Attorney, Agent, or Firm*—Armstrong, Westerman, Hattori, McLeland & Naughton

[57] ABSTRACT

A display panel and an information machine including the display panel, include a display panel unit having a display screen, and an inner cover for covering the inside of the display panel unit. A pair of metal fittings are screwed to side end portions of the display panel unit. In addition, an outer cover is provided for covering the outside of the display panel unit, where the outer cover and the display panel unit are both separately connected to the inner cover, so that the outer cover can be removed while leaving the display panel unit attached to the inner cover. Since the entire back surface of the display panel unit is exposed merely by removing the outer cover, the inspection and repair of the display panel unit is facilitated.

16 Claims, 9 Drawing Sheets

HINGED DISPLAY PANEL WITH OUTER COVER AND DISPLAY PANEL UNIT SEPARATELY CONNECTED TO AN INNER COVER AND INFORMATION MACHINE INCLUDING THE SAME

BACKGROUND OF THE INVENTION

1. Field of the Invention

The present invention relates to the structure of a display panel such as a liquid crystal display (hereinunder referred to as "LCD") which is pivotably supported by the main body of an information machine such as a personal computer or a word processor.

2. Description of the Related Art

Personal computers, word processors, etc. which are provided with a liquid crystal panel as the display unit are widely used. Especially, lap-top or portable information machines adopt a liquid crystal panel. In such an apparatus, the liquid crystal panel is made pivotable. When the liquid crystal panel is not used, it functions as a lid of the apparatus, thereby protecting the display surface and preventing the ingress of dust or the like. When the liquid crystal panel is used, it is set up so that the operator can operate the keyboard, etc. while watching the display surface.

The liquid crystal panel is composed of an LCD unit for actually displaying data, and an inner cover and an outer cover which constitute a case for accommodating the LCD unit. A large opening for exposing the display surface of the LCD unit is provided on the inner cover so that the operator can see the display surface of the LCD unit during use.

Provision of such a large opening on the inner cover greatly reduces the rigidity of the inner cover. Since the cover is generally made of a plastic material such as an ABS resin, the mechanical strength of the cover is greatly reduced if a large opening is provided thereon. To solve this problem, the LCD unit is attached to the outer cover which has no opening for exposing the display surface of the LCD unit in a conventional crystal liquid panel.

At the time of checkout or repair of such an apparatus with the LCD unit attached to the outer cover, the inner cover is first removed. However, the portion of the LCD unit which is exposed after the inner cover is removed is only a small portion around the display surface, so that the LCD unit must be removed from the outer cover in order to actually check out or repair the apparatus. Thus, there is a problem in the operability of the apparatus. In addition, in many apparatuses, the inner cover is provided with an operation switch and a locking mechanism, so that it is not easy to remove the inner cover itself.

The structure for attaching an LCD unit is described in, for example, Japanese Patent Laid-Open No. Sho 62-257512.

In order to pivotably fix a liquid crystal panel to the main body of a computer, a hinging mechanism is necessary. A liquid crystal panel is generally screwed to a rotary shaft provided on the main body. Such a hinging mechanism is described in, for example, Japanese Patent Laid-Open No. Sho 62-257512 and Japanese Utility Model Laid-Open No. Hei 1-76622.

In a general structure for attaching a liquid crystal panel, metal fittings are first fixed to a rotary shaft, and thereafter fixed again to the liquid crystal panel. According to this conventional method, positioning of the metal fittings, which is difficult, is required twice, so that the operability is deteriorated. Especially in the case of cutting the lower end of the liquid crystal panel in a shade of a gate in such a manner as to surround the rotary shaft attached to the main body in order to make the connecting portion good to look at, it is impossible to connect the liquid crystal panel with the rotary shaft by screwing from the outside, so that the assembly of the apparatus such as attachment of metal fittings is difficult.

When the outer cover of the liquid crystal panel is functioned as a lid of the apparatus, the liquid crystal panel is locked to the main body so that the liquid crystal panel is safe even while it is carried. In order to lock the liquid crystal panel, a locking claw is provided on a part of the liquid crystal panel and the claw is engaged with a hole or the like in the main body. Such a locking device is described in, for example, Japanese Patent Laid-Open No. Sho 64-78312.

In a conventional locking device, a hooking member for locking the liquid crystal panel to the main body is urged toward the locking position by a coil spring or the like, and when the locking operation is released, the hooking member is shifted to the unlocking position with a finger or the like. The coil spring for urging the hooking member either pulls the hooking member from the outside, or pushes the hooking member from the opposite side.

In such a locking device, since the coil spring is disposed in the vicinity of the hooking member, the space for accommodating the spring is necessary, which is an obstacle to the reduction of the size of the apparatus. In addition, in assembling the apparatus, it is necessary to combine the coil spring with one end thereof fixed to the liquid crystal panel to the hooking member, which makes the assembly difficult.

SUMMARY OF THE INVENTION

Accordingly, it is an object of the present invention to eliminate the above-described problems in the related art and to provide a display panel which is easy to assemble and which shows a good operability at the time of checkout or repair.

It is another object of the present invention to provide a locking mechanism for a display panel which enables a reduction in size of an information machine as a whole and facilitates the assembly of the machine.

It is still another object of the present invention to provide a structure for attaching a display panel to the main body of an information machine which facilitates the assembly of the apparatus and which provides an adequate mechanical strength for the display panel.

To achieve this aim, the present invention provides a display panel which is pivotably attached to the main body of an information machine so as to display various data, the display panel comprising:
- a display panel unit including a display screen and a driving circuit; and
- a pair of metal fittings which are screwed to both side end portions of the display panel unit so as to be rotatably supported by the main body of the machine.

The display panel further comprises:
- an outer cover for covering the outside of the display unit; and
- an inner cover for covering the inside of the display unit, the inner cover being provided with an opening for exposing the display portion of the display unit at the position corresponding to the display portion.

The inner cover is screwed to the display unit.

The inner cover may be screwed to the display unit together with the metal fittings.

According to this display panel, the display panel is accommodated in an inner cover. Consequently, it is possible to expose the entire part of the back side of the display unit merely by removing an outer cover, so that the operability is good at the time of checkout or repair. What is to be done in attaching the display unit to the main body is only to attach the inner cover to which the display unit is attached to the main body of the machine, and thereafter to attach the outer cover to the inner cover. Assembly of the machine is thus very easy. In addition, since the display unit is attached to the inner cover through metal fittings, an adequate mechanical strength of the inner cover is maintained.

The main body of the machine has a rotary shaft provided with a plate portion on both ends thereof and each of the pair of metal fittings may have a notch into which the plate portion of the rotary shaft is inserted and a hole through which the metal fitting is screwed to the rotary shaft. The metal fittings are screwed to the rotary shaft which is inserted into the notches.

According to this structure, the plate portions provided on the rotary shaft which protrudes from the main body of the information machine are positioned at the respective notches of the metal fittings. In this state, the plate portions are pushed into the notches. By this operation, the plate portions are held by the notches, so that it is very easy to screw the metal fittings to the rotary shaft through the holes.

The metal fitting has a first portion which is disposed along the side end portion of the display unit, a second portion which extends toward the inside of the display unit orthogonally to the first portion, and a third portion which extends toward the other end of the second portion orthogonally to the second portion. The notch is provided on the third portion and the hole through which the metal fitting is screwed to the rotary shaft is provided in the second portion. A hole through which the metal fitting is screwed to the display unit is also provided in the second portion.

The metal fitting of the display panel of the present invention includes:
 a hooking member which is longitudinally slidably held by the corresponding metal fitting and protrudes from the display panel toward the main body of the machine;
 a claw portion provided at the protruding end of the hooking member so as to engage a hole which is provided in the main body of the machine and to lock the display panel to the main body;
 a box-shaped spring container which is provided on the hooking member on the side facing the display panel so as to accommodate a coil spring therein; and
 a projection piece provided on the metal fitting so as to compress the coil spring in the spring container and urge the hooking member in one direction.

According to this structure, the coil spring is compressed by the projection piece provided on the metal fitting. It is therefore possible to urge the hooking member in one direction by the coil spring, and lock the display panel to the main body in the state in which the lower ends of the hooking members are inserted to the holes provided in the main body of the machine for this purpose. In the case of releasing the locking operation, the operator can easily unlock the display panel and the main body by manually shifting the hooking members. Since the coil spring is accommodated in the box-shaped spring container, reduction of the size of the locking device as a whole is possible. In addition, since the coil spring is accommodated in the box-shaped spring container, it is possible to assemble the locking device merely by engaging the coil spring with the projection piece in this state, thus greatly facilitating the assembly of the apparatus.

The hooking member is composed of a plate-like material and is provided with a protuberance on the opposite side to the box-shaped spring container so as to facilitate the movement of the hooking member with the operator's finger.

The metal fitting is provided with a slot having a predetermined size, and the hooking member is provided with a projection which is inserted into the slot so that the hooking member is slidably held by the metal fitting.

The metal fitting holds an unlocking member which protrudes out of the display panel toward the main body of the machine. The unlocking member is urged toward the main body of the machine by a spring.

An information machine according to the present invention having the main body of the machine provided therein with a keyboard, a computer and the like, and a display panel which is pivotably attached to the main body of the information machine so as to display various data is characterized by the display panel including:
 a display panel unit provided with a display unit screen and a driving circuit; and
 a pair of metal fittings which are screwed to both side end portions of the display panel unit so as to be rotatably supported by the main body of the machine.

The above and other objects, features and advantages of the present invention will become clear from the following description of a preferred embodiment thereof, taken in conjunction with the accompanying drawings.

DESCRIPTION OF THE PREFERRED EMBODIMENT

An embodiment of the present invention will be explained hereinunder with reference to the accompanying drawings.

Entire Structure

Figure 1:
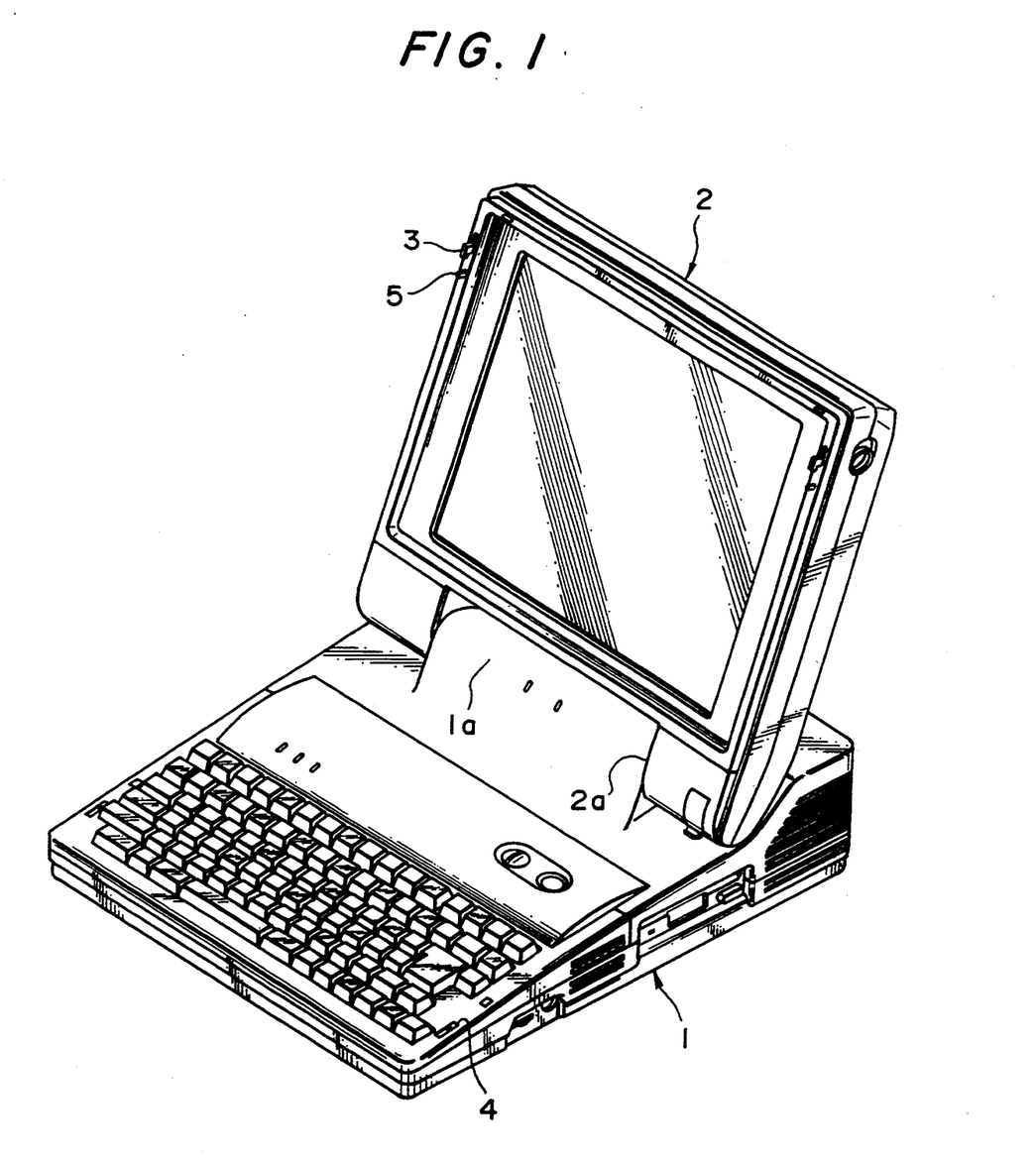
FIG. 1 is a perspective external view of a computer incorporating an embodiment of a display panel according to the present invention.

FIG. 1 is a perspective external view of a lap-top computer as an information machine which incorporates an embodiment of a display panel according to the present invention. The lap-top computer is composed of a computer body 1 provided therein with a CPU, an HDD, an FDD, etc. and a liquid crystal panel 2 as a display panel having a display portion. The liquid crystal panel 2 has a notched portion 2a at the lower end thereof, and the liquid crystal panel 2 is pivotably supported at the notched portion 2a by a bulgy portion 1a of the computer body 1. In FIG. 1, the liquid crystal panel 2 is set up. In this state, the operator turns on the switch and operates the keyboard and the like while watching the display portion. When the computer is not used, the liquid crystal panel 2 is rotated toward the computer body 1 so as to cover the upper surface of the computer body 1 with the liquid crystal panel 2.

Liquid Crystal Panel

Figure 2:
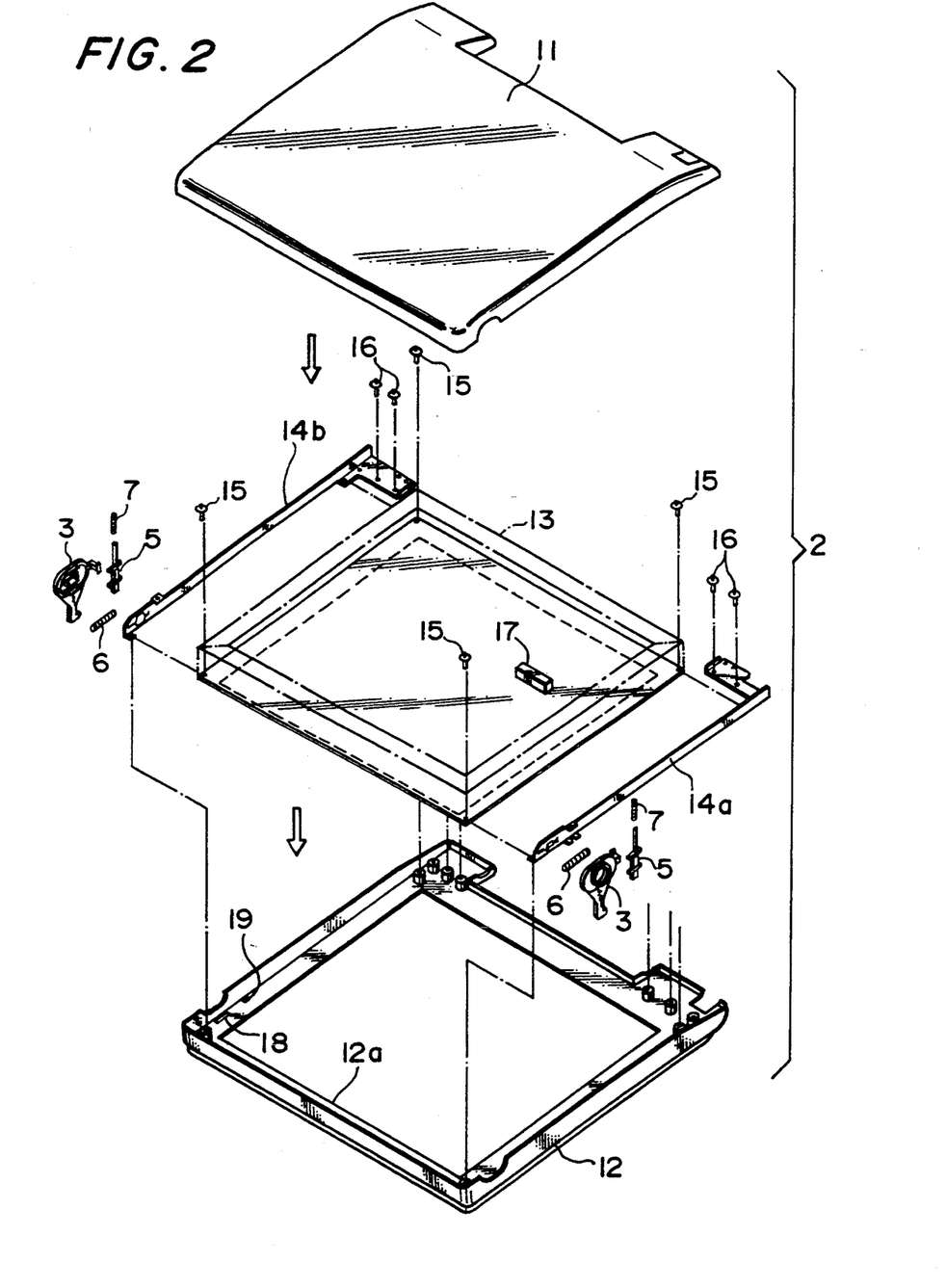
FIG. 2 is an explanatory exploded view of the structure of the embodiment shown in FIG. 1.

The structure of the liquid crystal panel 2 will now be explained with reference to FIG. 2. FIG. 2 shows the process for assembling the liquid crystal panel 2. The liquid crystal panel 2 has an outer cover 11 and an inner cover 12 which corresponds to the outer cover 11. By combining these covers 11, 12, the shell of the liquid crystal panel 2 is produced. An LCD unit 13 is accommodated in this shell as a display unit having a liquid crystal display portion for displaying various data. The LCD unit 13 is screwed to the inner cover 12 together with a pair of metal fittings 14a, 14b by four screws 15. The metal fittings 14a, 14b are further screwed to the inner cover 12 by four screws 16. In this way, both side ends of the LCD unit 13 are fixed to the metal fittings 14a, 14b and reinforced thereby. The metal fittings 14a, 14b reinforce the inner cover 12.

In assembling the liquid crystal panel 2, after the LCD unit 13 is attached to the inner cover 12 together with the metal fittings 14a, 14b, the outer cover 11 is attached to the inner cover 12 by an appropriate means. For example, hooks (not shown) which engage the end portions of the inner cover 12 are provided at the end portions of the outer cover 11, and the inner cover 12 is screwed to the outer cover 11 at several points. According to this embodiment, it is possible to see the back surface of the LCD unit 13 in the state in which the outer cover 11 is removed, thereby facilitating the checkout or the like of the LCD unit 13. A connector 17 for electrically connecting the LCD unit 13 with the computer body 1 is provided on the back surface of the LCD unit 13. Therefore, simply by removing the outer cover 11, disconnection between the LCD unit 13 and the computer body 1 through the connector 17 is facilitated and the removal of the LCD unit 13 is also facilitated.

Most of the inner cover 12 constitutes an opening 12a for exposing the display surface of the LCD unit 13 so that the mechanical strength of the inner cover 12 is low, but since the inner cover 12 is reinforced by the metal fittings 14a, 14b, it is possible to accommodate and hold the LCD unit 13 with high reliability.

If the LCD unit 13 used has a high resolution, the weight of the LCD unit 13 increases. If the weight of the LCD unit 13 is as heavy as about 2 kg, for example, a steel plate of about 2 mm thick is used as the metal fittings 14a and 14b.

Locking Mechanism

A hooking member 3 is provided within both side end portions of the liquid crystal panel 2, and the end portion of the hooking member 3 is inserted into a hook receiver 4 provided at the corresponding portion of the computer body 1, so that the liquid crystal panel 2 is locked to the computer body 1 when the liquid crystal panel 2 is closed. Unlocking members 5 are provided in the vicinity of the hooking members 3 so as to urge the liquid crystal panel 2 in the opposite direction to the computer body 1. A spring 6 urges the hooking member 3, and a spring 7 urges the unlocking member 5. The inner cover 12 is also provided with holes 18 through which the lower ends of the hooking members 3 are projected from the inner cover 12, and holes 19 through which the lower ends of the unlocking members 3 are projected from the inner cover 12.

Figure 3A:
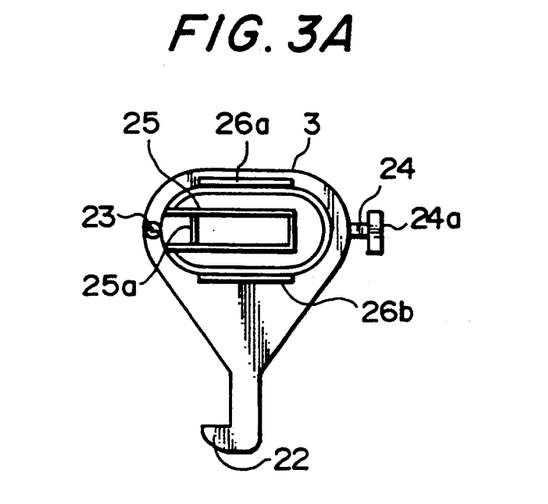
FIGS. 3A to 3C show the structure of a hooking member used in the embodiment, wherein 3A is one side view, 3B is a plan view and 3C is the other side view.
Figure 3B:
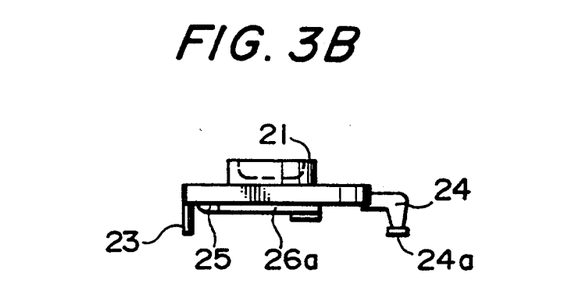
Figure 3C:
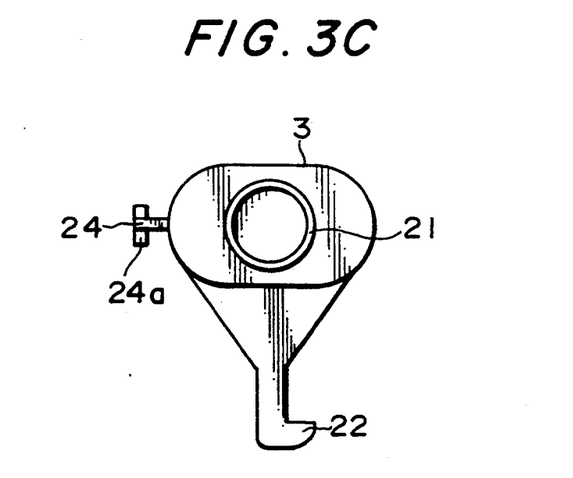

Referring to FIGS. 3A and 3C, the hooking member 3 has a circular protuberance 21 on the outer surface so as to be moved with a finger laid on the circular protuberance 21. A claw portion 22 is provided at the lower end of the hooking member 3. On the opposite surface of the hooking member 3, a rod-like key 23, an L-shaped projection 24, a box-shaped spring container 25, and a pair of projections 26a, 26b are provided. An enlarged portion 24a is formed at the end of the L-shaped projection 24, and a spring retainer 25a for retaining one end of the spring 6 is provided in the spring container 25.

Figure 4:
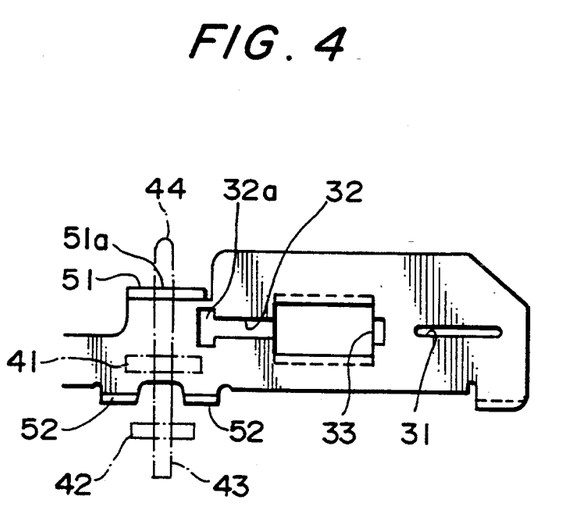
FIG. 4 shows the structure of the end portion of a metal fitting used in the embodiment.

The end portion of the metal fitting 14a to which the hooking member 3 is attached is provided with a key groove 31 for slidably holding the key 23, an L-shaped projection groove 32 for slidably holding the L-shaped projection 24, and a spring retainer 33 for retaining the other end of the spring 6 in the spring container 25, as shown in FIG. 4.

In attaching the hooking member 3 to the end portion of the metal fitting 14a, the L-shaped projection 24 is first inserted into the L-shaped projection groove 32. In this case, the enlarged portion 24a of the L-shaped projection 24 is inserted through an enlarged portion 32a provided at the left end of the L-shaped projection groove 32 in FIG. 4. The spring 6, which is a coil spring, is accommodated in the spring container 25 in advance. The left end of the spring 6 is disposed at the left end of the spring container 25 and compressed toward the left end so as to engage the coil spring with the spring retainer 25a having a small height. The hooking member 3 with the spring 6 accommodated in the spring container 25 is caused to slide until the spring retainer 33 engages the other end of the spring 6 and compresses the spring 6. The hooking member 3 is then pressed against the metal fitting 14a and the key 23 is inserted into the key groove 31. In this way, the hooking member 3 is urged toward the end portion of the metal fitting 14a by the urging force of the spring 6. When the metal fitting 14a is screwed to the inner cover 12 by the screw 15 in this state, the lower end of the hooking member 3 projects from the hole 18 provided in the inner cover 12 toward the computer body 1.

Unlocking Mechanism

Figure 5:
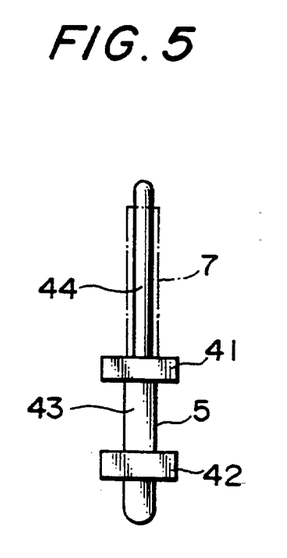
FIG. 5 shows the structure of an unlocking member used in the embodiment.

In this embodiment, the unlocking member 5 is composed of a rod-like member 43 having protruding portions 41, 42 and a spring rod 44, as shown in FIG. 5. The unlocking member 5 is retained by the end portion of the metal fitting 14a. As shown in FIG. 4, the metal fitting 14a is provided with a hole 51a formed in a spring retainer 51 so as to receive the end of the spring rod 44, and a pair of protruding portion retainers 52 for holding the protruding portion 41 or 42. The upper end of the spring rod 44 with the spring 7 mounted thereon is inserted into the hole 51a. Since the spring 7 is mounted around the spring rod 44, one end of the spring 7 is retained by the spring retainer 51 surrounding the hole 51a. The other end of the spring 7 is retained by the pair of protruding portion retainers 52. In this way, the unlocking member 5 is pushed downward as a whole until the protruding portion 41 is received by the pair of protruding portion retainers 52. In this state, the unlocking member is retained by the metal fitting 14a.

Figure 6A:
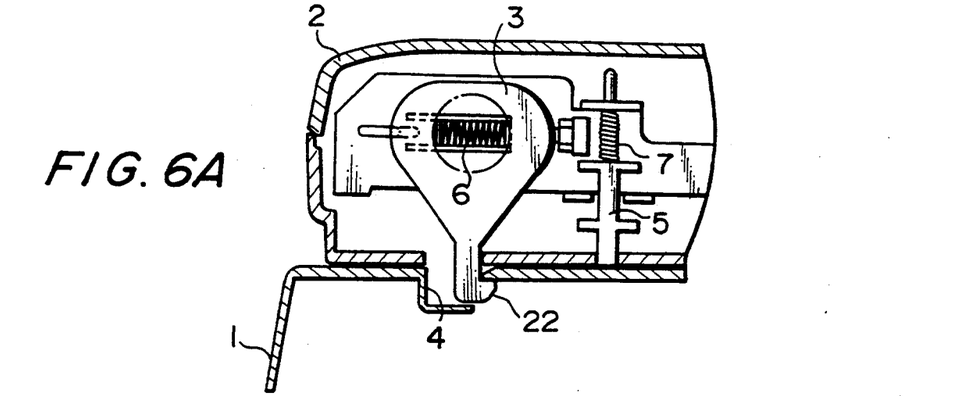
FIGS. 6A, 6B and 6C are explanatory views of the locking operation of the embodiment.

The locking and unlocking operations will now be explained with reference to FIGS. 6A to 6C. As shown in FIG. 6(A), the hooking member 3 is urged toward the shaft of the liquid crystal panel 2 by the compressing force of the spring 6. The claw portion 22 at the lower end of the hooking member 3 is therefore pressed against the proximal end portion of the hole 4 formed in the computer body 1, thereby locking the liquid crystal panel 2 to the computer body 1.

Figure 6B:
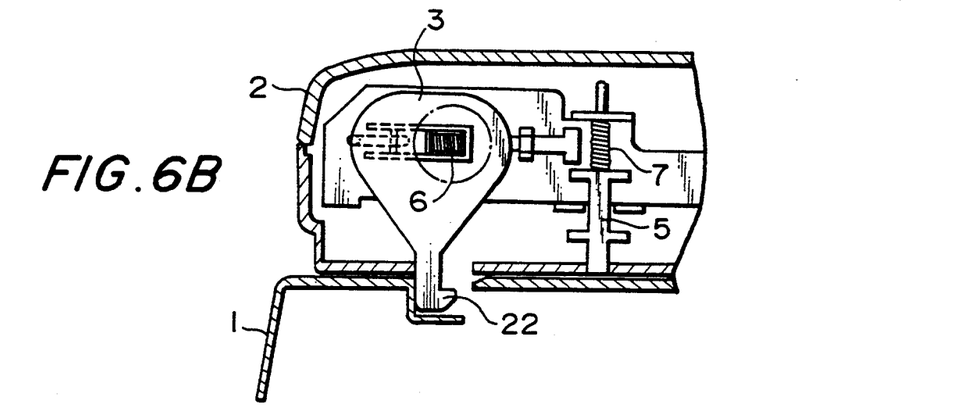
Figure 6C:
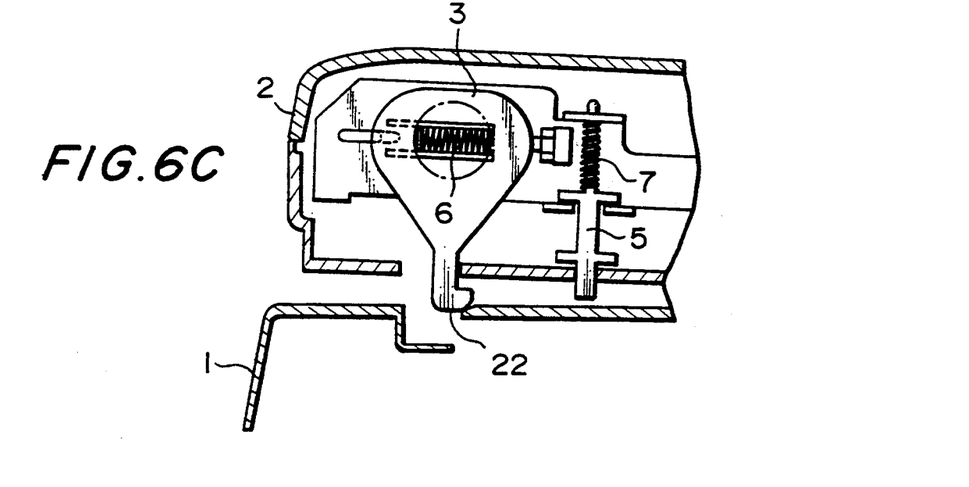

When the hooking member 3 is pulled leftward in FIG. 6B with a finger, the hooking member 3 as a whole moves against the urging force of the spring 6, so that the claw portion 22 at the lower end of the hooking member 3 is allowed to freely move in the hole 4. Then, the unlocking member 5 pushes the surface of the computer body 1 by the urging force of the spring 7, thereby pushing up (rotating) the liquid crystal panel 2. At this time, the lower end of the hooking member 3 is situated on the surface of the computer body 1. If the finger is released from the hooking member 3 in this state, the hooking member 3 is restored to its original position by the elastic force of the spring 6. As a result, the claw portion 22 is situated between the surface of the computer body 1 and the surface of the liquid crystal panel 2, as shown in FIG. 6 (C), thereby unlocking the liquid crystal panel 2 and the computer body 1. Consequently, the operator can easily rotate the liquid crystal panel 2 and set it up.

When the liquid crystal panel 2 is closed, the unlocking member 5, which has elasticity, functions as a kind of buffer. If the liquid crystal panel 2 is about to be closed roughly, the force is suppressed by the unlocking member 5, thereby preventing a damage or the like due to the collision between the liquid crystal panel 2 and the computer body 1. The covers 11, 12 are preferably produced from an ABS resin or the like. The hooking member 3 is preferably produced from POM (polyoxy methylene) having high wear resistance.

Hinging Mechanism

Figure 7A:
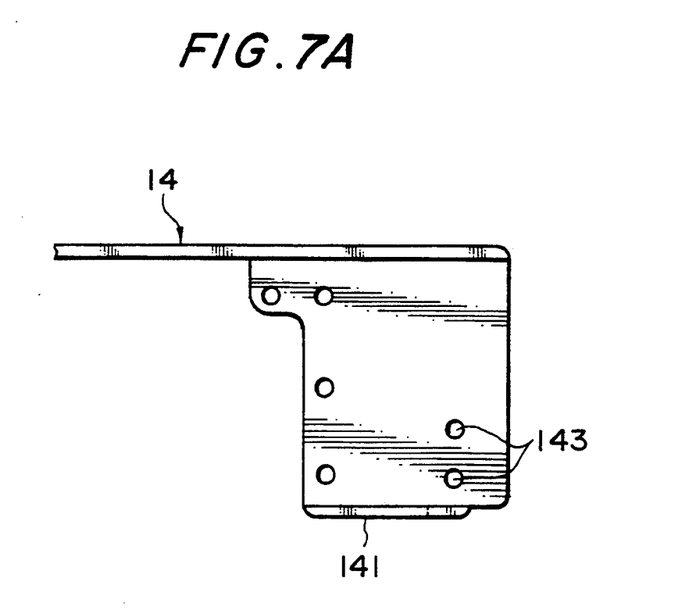
FIGS. 7A and 7B show the structure of the main part of the metal fitting.
Figure 7B:
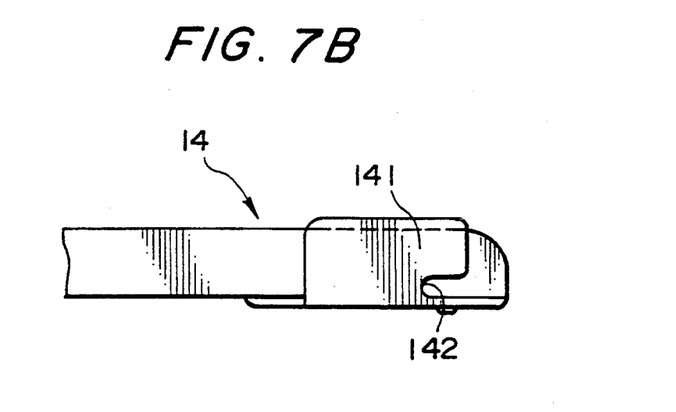

FIGS. 7A and 7B are a plan view and a side elevational view of the portion of the metal fitting 14 (metal fitting 14 in FIGS. 7A and 7B generically refers to either of metal fittings 14a or 14b of FIG. 2) which connects the liquid crystal panel 2 with the computer body 1.

Figure 8:
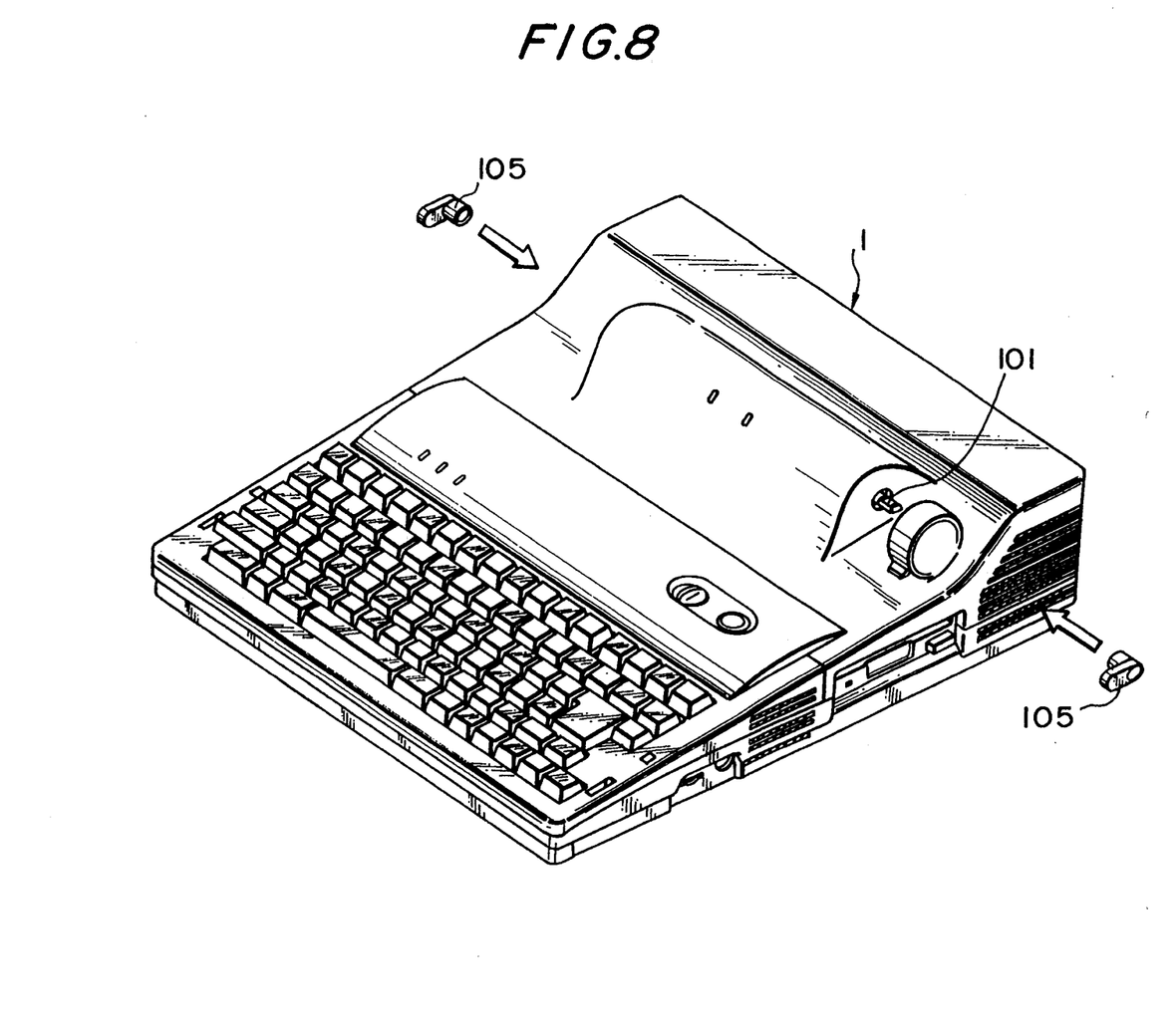
FIG. 8 is an explanatory perspective view of a shaft attached to the main body of the computer.
Figure 9A:
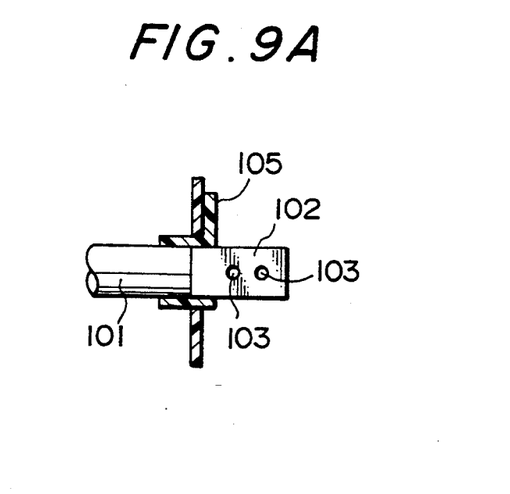
FIGS. 9A and 9B show the structure of the end portion of the shaft shown in FIG. 8.
Figure 9B:
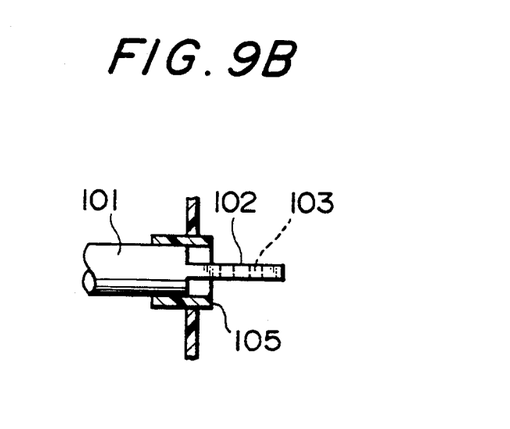

A bent-up portion 141 is formed at the end portion of the metal fitting 14, and a notch 142 is formed at the end of the bent-up portion 141. Holes 143 are formed by the side of the notch 142. FIG. 8 is a perspective view of the computer body 1. A shaft 101 is penetrated through the bulgy portion of the computer body 1 at which the liquid crystal panel 2 is fixed to the computer body 1. The shaft 101 is provided with a plate portion 102 at both ends thereof, and two holes 103 are formed at the plate portion 102, as shown in FIGS. 9A and 9B. The holes 103 are formed at the positions corresponding to the holes 143 provided in the metal fitting 14.

Figure 10A:
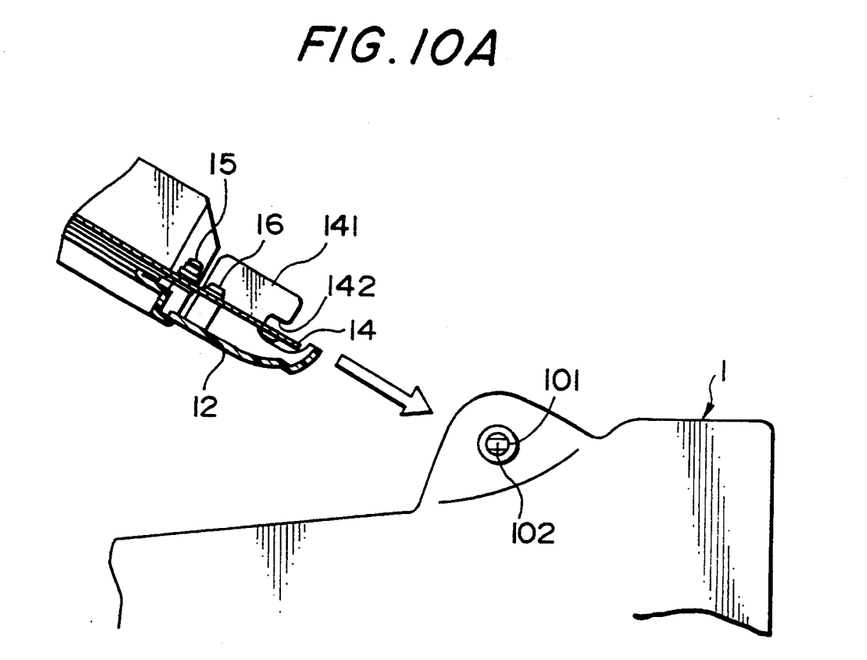
FIGS. 10A and 10B are explanatory views of the process for attaching the shaft to the main body.
Figure 10B:
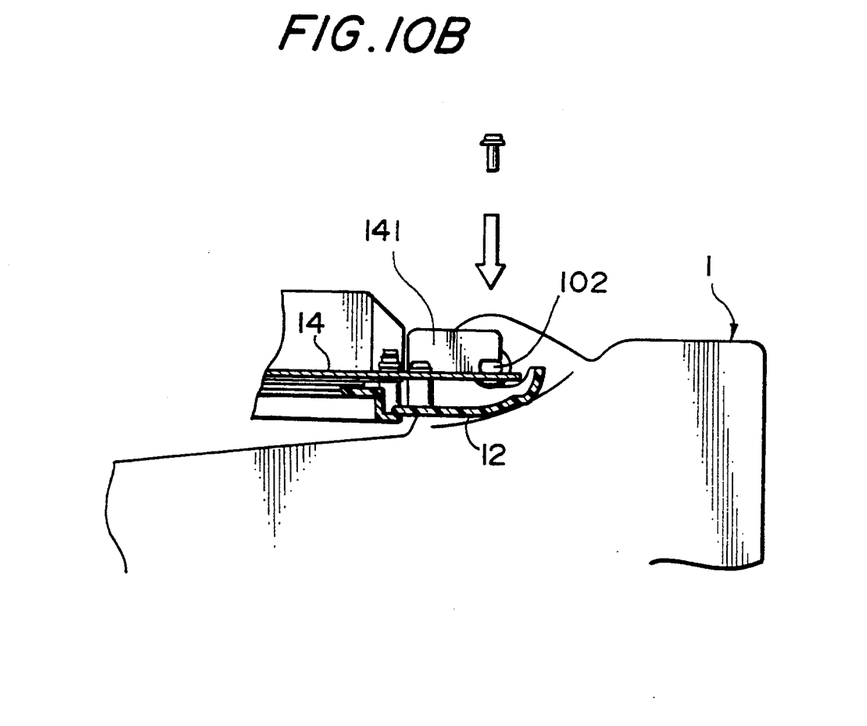

In mounting the liquid crystal panel 2 on the computer body 1, the plate portion 102 of the shaft 101 is inserted into the notch 142 of the metal fitting 14 in the state in which the LCD unit 13 and the metal fitting 14 are attached to the inner cover 12, as shown in FIGS. 10A and 10B. Since the proximal end of the plate portion 102 is in correspondence with the position at which the metal fitting 14 is attached to the inner cover 12, it is possible to prevent the liquid crystal panel 2 from horizontally moving in the state in which the plate portion 102 is inserted into the notch 142.

The depth of the notch 142 is a predetermined value which makes the positions of the holes 103 coincide with the position of the tap holes 143 in the state in which the shaft 101 reaches the innermost of the notch 142. In this way, since the positions of the holes 103 coincide with the position of the holes 143 in the state in which the plate portion 102 of the shaft 101 is inserted to the innermost of the notch 142, it is easy to fix the liquid crystal panel 2 to the computer body 1 by screwing. That is, all the elements of the liquid crystal panel 2 except the outer cover 11 are thus fixed in this state. Consequently, the checkout and the repair of the computer is facilitated in the state in which the outer cover 11 is removed.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A display panel which is pivotably attached to the main body of a machine so as to display various data, said display panel comprising:
    a display panel unit including a display screen;
    an outer cover for covering the outside of said display panel unit;
    an inner cover for covering the inside of said display unit, said inner cover being provided with an opening for exposing the display portion of said display unit at the position corresponding to said display portion;
    a pair of metal fittings which are screwed to side end portions of said display panel unit so as to be rotatably supported by the main body of said machine;
    wherein said outer cover and said display panel unit are both separately connected to said inner cover such that said outer cover can be removed while leaving said display panel unit attached to said inner cover.

2. A display panel according to claim 1, wherein said display panel is hingedly connected to the main body of the machine, for closing over a bottom portion of the machine.

3. A display panel according to claim 1, wherein said inner cover is screwed to said display unit.

4. A display panel according to claim 3, wherein said inner cover is screwed to said display unit together with said metal fittings.

5. A display panel according to claim 4, wherein
the main body of said machine includes a rotary shaft provided with a plate portion on both ends thereof; and
each of said pair of metal fittings is provided with a notch into which said plate portion of said rotary shaft is inserted and a hole through which said metal fitting is screwed to said rotary shaft.

6. A display panel according to claim 5, wherein
each of said metal fittings includes a first portion which is disposed along the side end portion of said display unit, a second portion which extends toward the inside of said display unit orthogonally to said first portion, and a third portion which extends toward the other end of said second portion orthogonally to said second portion; and
said notch is provided on said third portion and said hole through which said metal fitting is screwed to said rotary shaft is provided in said second portion.

7. A display panel according to claim 6, wherein said second portion is provided with a hole through which said metal fittings is screwed to said display unit.

8. A display panel according to claim 4, wherein said display panel unit is a liquid crystal display panel.

9. A display panel according to claim 8, wherein said machine is a personal computer.

10. A display panel according to claim 8, wherein said machine is a portable lap-top computer.

11. A display panel according to claim 8, wherein said machine is a word processor.

12. A display panel according to claim 1, wherein each of said metal fittings includes:
a hooking member which is longitudinally slidably held by the corresponding metal fitting and protrudes from said display panel toward the main body of said machine;
a claw portion provided at the protruding end of said hooking member so as to engage a hole which is provided in the main body of said machine and to lock said display panel to the main body;
a box-shaped spring container which is provided on said hooking member on the side facing said display panel so as to accommodate a coil spring therein; and
a projection piece provided on said metal fitting so as to compress said coil spring in said spring container and urge said hooking member in one direction.

13. A display panel according to claim 12, wherein said hooking member is composed of a plate-like material and is provided with a protuberance on the opposite side to said box-shaped spring container so as to facilitate the movement of said hooking member with the operator's finger.

14. A display panel according to claim 12, wherein each of said metal fittings is provided with a slot having a predetermined size, and said hooking member is provided with a projection which is inserted into said slot so that said hooking member is slidably held by said metal fitting.

15. A display panel according to claim 12, wherein each of said metal fittings holds an unlocking member which protrudes out of said display panel toward the main body of said machine, and said unlocking member is urged toward the main body of said machine by a spring.

16. An information machine for processing various kind of information having a main body provided therein with a keyboard, a computer, and a display panel which is pivotably attached to the main body of said information machine so as to display various data, the improvement comprising said display panel including:
a display panel unit provided with a display unit screen;
an outer cover for covering the outside of said display panel unit;
an inner cover for covering the inside of said display panel unit, said inner cover being provided with an opening for exposing the display portion of said display unit at the position corresponding to said display portion; and
a pair of metal fittings which are screwed to side end portions of said display panel unit so as to be rotatably supported by the main body of said information machine;
wherein said outer cover and said display panel unit are both separately connected to said inner cover such that said outer cover can be removed while leaving said display panel unit attached to said inner cover.

* * * * *